United States Patent [19]

Alley et al.

[11] 4,029,993

[45] June 14, 1977

[54] TWO LEVEL INVERTER CIRCUIT

[75] Inventors: Robert Philbrick Alley; Keith Karl Klett, both of Danville, Ill.

[73] Assignee: General Electric Company, Carmel, Ind.

[22] Filed: Dec. 18, 1975

[21] Appl. No.: 642,014

[52] U.S. Cl. .................................. 315/219; 307/66; 315/86; 315/209 R; 315/DIG. 5; 331/183

[51] Int. Cl.² ........................................ H05B 41/29

[58] Field of Search ................. 315/86, 209 R, 219, 315/220, 246, DIG. 5, DIG. 7; 307/64, 66, 157; 331/183; 317/31, 141 S

[56] References Cited
UNITED STATES PATENTS

| | | | |
|---|---|---|---|
| 3,573,544 | 4/1971 | Zonis et al. | 315/219 X |
| 3,688,123 | 8/1972 | Walker | 315/86 X |
| 3,743,921 | 7/1973 | Legg et al. | 315/219 X |
| 3,882,357 | 5/1975 | Nieuweboer et al. | 315/209 R |
| 3,921,005 | 11/1975 | Watrous | 307/66 X |

Primary Examiner—Eugene R. La Roche

[57] ABSTRACT

An emergency lighting system includes a two-level switching transistor inverter circuit for starting and operating a fluorescent lamp from a battery upon failure of line voltage. One of the switching transistors of the two transistor inverter is arranged for connection first to a tap, then to one of the feed-in terminals of an output transformer coupled with the lamp. A timing controller effects this switching thereby automatically to provide, first, a high power level for starting the lamp, and then, a second lower power level for operating the lamp after starting.

11 Claims, 3 Drawing Figures

TWO LEVEL INVERTER CIRCUIT

BACKGROUND OF THE INVENTION

I. Field of the Invention

The present invention relates to a two level inverter circuit for operating a gaseous discharge lamp, and more particularly, to an emergency lighting circuit for operating a gaseous discharge lamp from a DC energy source upon failure of the primary AC source, the circuit being provided with two power level operation to conserve energy in the DC source.

II. Description of the Prior Art

Electric power failures due to inclement weather conditions and equipment breakdowns have been a plague for many years. A power failure, no matter what may be the cause, may very well jeopardize human life due to lighting system failure. There are, therefore, many installations which require some type of emergency lighting system which will automatically come into operation upon the occurrence of a power failure. The high efficiency of a fluorescent lamp makes it especially valuable for use in an emergency lighting system.

Presently available emergency lighting systems are generally of the type using transistor switching inverter circuitry. In a typical arrangement, a single lamp (or group of lamps) is used for both normal AC operation of the lighting system and for the emergency system, a rechargeable battery being the power source for energizing the transistor inverter when the AC line voltage fails. A principle limitation of such emergency lighting systems resides in battery capacity, that is, the amount of lamp operating time a given battery will provide. To be taken into consideration is the fact that a higher power level is required to start such a lamp than is required to maintain it in operation once started. This especially is the case in an arrangement wherein the lamp is 8 feet in length, and over. Operating the lamp after starting at the same power level as is required to effect starting results in the operating life of the battery, and therefore of the system, being less than recommended.

It is desirable therefore to provide an emergency lighting system capable of maximizing the operating time on a given battery charge.

Accordingly, it is an object of the present invention to provide an emergency lighting system having an inverter capable of operating on two power levels: a high power level for starting the lamp and a lower power level for running the lamp after starting.

SUMMARY OF THE INVENTION

In accordance with the present invention, there is provided an improved inverter circuit for operating at least one gaseous discharge lamp from a DC electrical energy source. Included are means for automatically operating the circuit on at least two power levels: a first power level for starting the lamp and a second lower power level for operating the lamp after starting.

In the preferred embodiment, there is provided an improved emergency lighting circuit for operating at least one gaseous discharge lamp including means for connection to an AC electrical energy source for energizing the lamp during normal conditions when the AC source voltage is above a predetermined value and an inverter and an auxiliary electrical energy source for operating the lamp during emergency conditions when the AC source voltage is below a predetermined value. Included are means for automatically operating the inverter on at least two power levels for better matching the inverter output capabilities to the lamp starting requirements, and after starting, to lamp run requirements.

DESCRIPTION OF THE PREFERRED EMBODIMENT

Figure 1:
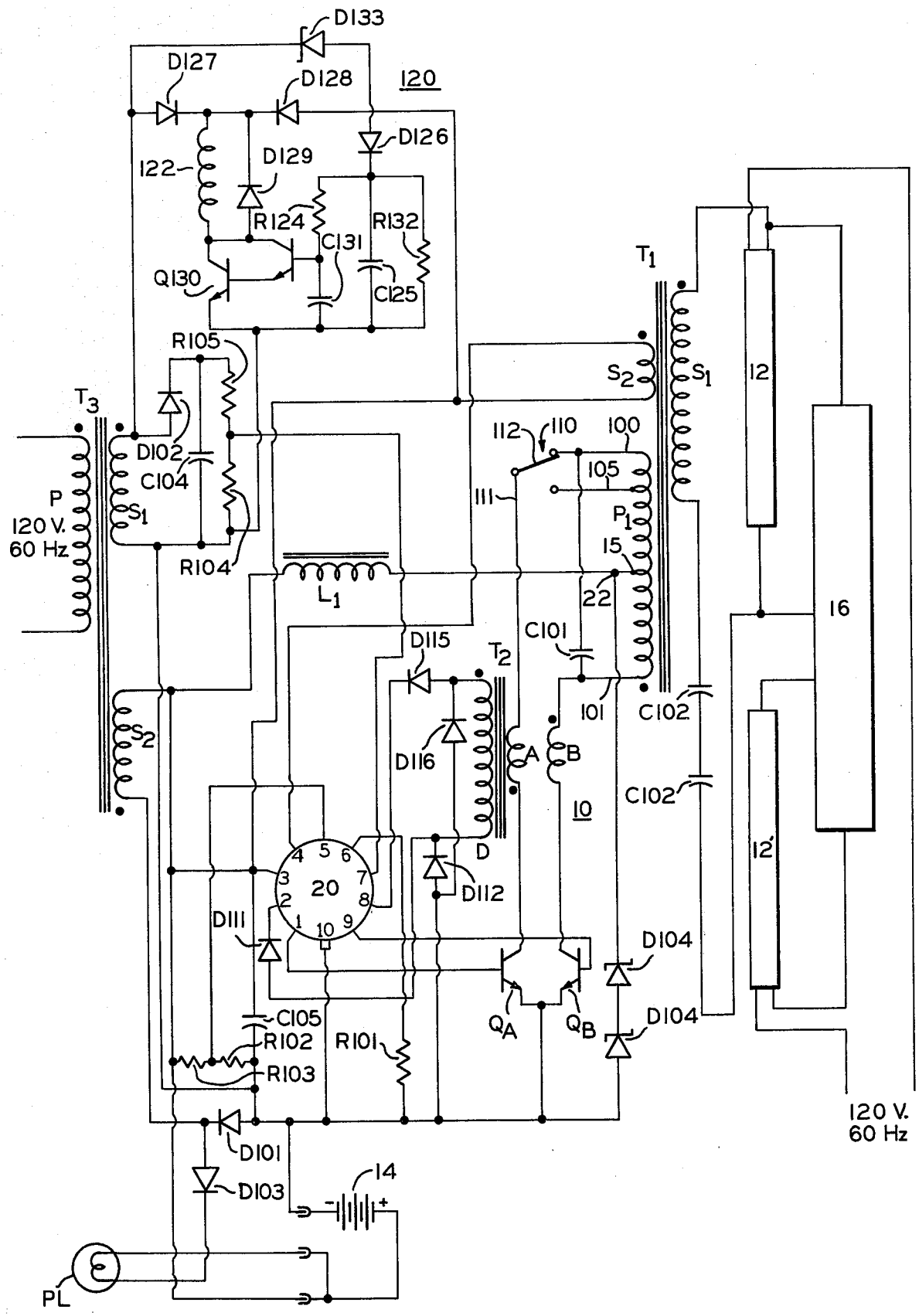
FIG. 1 is a detailed schematic representation of the preferred embodiment of the circuit of the present invention.

Referring to FIG. 1, there is shown an emergency lighting system circuit which will automatically become operative upon the failure of the primary electric source. Such a system is disclosed and claimed in U.S. Pat. No. 3,921,005 - Watrous, assigned to the same assignee as the present invention and which is incorporated herein by reference. A tuned inverter 10 includes a pair of power transistors $Q_A$ and $Q_B$ capable of operation in a low loss switching mode to energize a load such as gaseous discharge lamps 12. An auxiliary electrical energy source in the form of a rechargeable battery 14 provides the power necessary to operate the inverter 10. A buffer inductance L1 serves to enable transistors $Q_A$ and $Q_B$ to operate in a low loss switching mode. A first transformer T1 couples the inverter 10 with the lamp 12 and is resonated with capacitors C101 and C102 to set the operating frequency of the inverter and to establish a sinusoidal output voltage. Inductor L1 is electrically connected with center tap 15 of primary winding P1 forming a part of transformer T1.

A control circuit 20 (in this preferred embodiment, an integrated circuit) is provided for supplying base drive for switching transistors $Q_A$ and $Q_B$ at zero collector voltage. That is, when the instantaneous voltage across transformer T1 varies at fundamental frequency, the voltage at point 22 and hence across inductor L1 varies at twice the fundamental frequency. The current through L1 is DC with a second harmonic component. This same current is alternately carried by the two transistors $Q_A$ and $Q_B$. While the transistors are required to switch collector current, they do so at essentially zero collector voltage with a resultant low power dissipation. An auxiliary winding S2 magnetically coupled with the primary winding P1 of first transformer T1 provides timing information to the control circuit 20 for effecting switching of the respective transistors $Q_A$ and $Q_B$ in step with the natural resonant frequency of the inverter. Thus, the control circuit 20 tracks the resonant frequency of first transformer T1 and insures that transistor switching occurs when the voltage across capacitor C101 is zero. Winding T1S2 is not used as a source of energy for driving the transistors $Q_A$ and $Q_B$ because of its sinusoidal waveform.

A feedback transformer T2 is provided to supply a feedback current to the control circuit 20 for effecting transistor base drive proportional to transistor collector current thereby to effect higher efficiency in the inverter 10. Feedback transformer T2 has a feedback winding D magnetically coupled to the respective collectors of the transistors $Q_A$ and $Q_B$ through a pair of windings A and B respectively. Thus, the power consumed by the control circuit 20 can be limited to that required to start and control the oscillation of the inverter 10. Lamps 12 are coupled to an AC source through a ballast 16 for operation during normal conditions when the AC source voltage is above a predetermined value. An impedance limited transformer T3 provides, among other things, means for charging battery 14. Battery 14 is connected to a secondary winding S2 of transformer T3 through a diode D101.

The emergency lighting system circuit shown in FIG. 1 operates generally as follows. Control circuit 20 includes a first sensor (not shown) for sensing the voltage of the battery. Further details of the operation of the control circuit 20 may be had by referring to the above mentioned Watrous patent. Control circuit 20 also includes logic means (not shown) combining the outputs of the first sensor and the second sensor to enable inverter 10 when the battery voltage is above a predetermined level and the AC voltage is below a predetermined level and to disable the inverter when the battery voltage is below a predetermined level or the AC voltage is above a predetermined level.

Assuming now that the inverter 10 is enable to run, control circuit 20 supplies a small base drive signal to one of the transistors $Q_A$ or $Q_B$. Assuming that the base drive is applied to $Q_A$, transistor $Q_A$ turns on and current starts to flow from battery 14 through inductor L1, to center tap 15 of the primary P1 of transformer T1, thence through P1 and through the A winding of feedback transformer T2, through transistor $Q_A$ thence back to the battery. The base drive originally supplied to transistor $Q_A$ is augmented by a current flowing from winding D of feedback transformer T2 to the control circuit 20 to exit from pin 1 thereof thence to flow through the base of transistor Q. This base drive then is proportional to the collector current of transistor $Q_A$ and is designed to be adequate to keep the transistor in saturation.

At some volt-second product, feedback transformer T2 saturates sharply, suddenly reducing the output current of winding D thereof, thereby reducing the base drive to transistor $Q_A$. A sudden rise in collector-emitter voltage on transistor $Q_A$ sharply reduces the rate of current rise in this DC circuit. This change in collector current with respect to time reverses the polarity of the S2 winding of transformer T1 and hence the polarity of the voltage on pins 3 and 4 of the control circuit 20. This reversal of polarity signals the control circuit to change the base drive from transistor $Q_A$ to transistor $Q_B$.

Control circuit 20 now supplies a small amount of base drive through pin 9 to the base of transistor $Q_B$ and simultaneously connects the base of $Q_A$ to the emitter thereof to hasten the turn-off process of transistor $Q_A$. Transistor $Q_B$ starts to conduct as a result of the small base drive signal from the control circuit and current flows through winding B of feedback transformer T2 to induce a current in winding D thereof. This current is supplied to control circuit 20. Control circuit 20 now supplies this current as base drive out of pin 9 to the base of $Q_B$; thus the base drive of $Q_B$ is proportional to the collector current thereof such that the transistor is kept in saturation.

Transformer T1 has an air gap and operates as a nearly linear inductor. When the voltage across winding P1 of transformer T1, and thereby the voltage on winding S2 of that transformer, reaches zero, this event is signaled to the control circuit 20 through pins 3 and 4 thereof. The control circuit again switches the base drive circuitry to transistor $Q_A$ and connects the base of $Q_B$ to the emitter thereof to hasten the switching off of the transistor $Q_B$. The circuit is then ready to go through the next half cycle with $Q_A$ conducting.

If switching could be accomplished in absolute zero time, the above described circuit operation would be entirely correct. However, the switching is accomplished normally in periods of less than one microsecond and the current flow from the battery 14 is essentially at a constant level with a small ripple content. This ripple content is determined by the inductance of L1 which adds or subtracts from the battery voltage as applied to the center tap 15 on the primary winding of transformer T1. It is this inductor L1 which adjusts the voltage at point 22 in such a way that the transistors may be switched at zero collector voltage. As long as this inductance L1 has a value exceeding a critical value, the circuit will function as described. In the event that both transistors $Q_A$ and $Q_B$ are in the off state, the rate of current change in L1 forces the voltage thereacross to a value where zener diodes D104 start conducting to limit the voltage applied to the circuit. This clipping action rapidly reduces circuit efficiency and hence is an operational mode to be avoided. Such clipping action can occur momentarily during the starting process or when the inverter is turned off and under these conditions represents an acceptable design operating condition.

The load for the inverter 10 which includes lamp 12 is connected to winding S1 of transformer T1. For fluorescent emergency lighting purposes, the ballasting is done by capacitors C102 which determine the load current through the lamp 12. These capacitances in conjunction with C101 and the inductance of T1P1 determine the operational frequency of this system. (The inductance of the P1 winding and the capacitance of C101 determine the oscillating frequency when S1 is unloaded.) A double capacitive ballast system is used to reduce the voltage across a single unit and thus enhance the reliability of the complete system. The voltage output of the inverter circuit is high enough to instant start 8 feet long instant start lamps under fairly adverse conditions.

As stated above, battery charging is accomplished through winding S2 of 60 Hz transformer T3. Half wave charging current is coupled to a non-linear load, the battery 14, through diode D101 and is limited in magnitude by the impedance of the transformer. Because of the transformer impedance, the sinusoidal voltage at the terminals of winding S2 is clamped at the battery voltage when diode D101 conducts. On the alternate half cycle, diode D103 conducts half wave current through indicator lamp PL and the dual prong battery plug. Thus, the battery must be plugged in and 120 volt AC power available to energize lamp PL indicating that the battery is charging. Using the alternate half cycle reduces the volt-amp rating of the transformer T3. For monitoring the AC source voltage, means are provided for coupling secondary winding S1 of the transformer T3 with a linear load during an alternate half cycle. To this end, during the half cycle alternate from that in which the battery is charged, capacitor C104 is charged through diode 102. This DC monitoring voltage is connected to the first sensor means through pin 7 of control circuit 20 and through a linear load, resistor divider R104 and R105. The DC voltage at pin 7 is proportional to the average value of the 60 Hz supply voltage and is not influenced by the aforesaid clamping action of the battery. Thus, transformer T3 serves a dual purpose.

As hereinbefore stated, it is desirable that, upon failure of line voltage, a battery serves to operate a fluorescent lamp in an emergency lighting system for at least one and a half hours. In accordance with the present invention, there is provided in an inverter circuit for operating at least one gaseous discharge lamp from a DC electrical energy source, means for operating the circuit on at least two power levels including a first power level for starting the lamp and a second lower power level for operating the lamp after starting thereby to conserve the DC energy source. In the preferred embodiment, as shown in FIG. 1, inverter circuit 10 includes output transformer T1 including primary winding P1 for coupling the inverter 10 with the lamp load. Primary winding P1 of transformer T1 includes a pair of power feed-in terminals 100 and 101 and a tap 105. A snap action relay switch 110 is provided having its common terminal 111 connected through winding A of feedback transformer T2 to transistor $Q_A$. Switch 100 has a contact 112 moveable between feed-in connector 100 and tap 105. Means are provided for automatically switching switch 110 between feed-in terminal 100 and tap 105. This takes the form of control means 120, the operation of which will now be discussed.

When 60 Hz is applied to the input terminals of the primary winding P of transformer T3, capacitor C125 is quickly charged through zener diode D133 and diode D126. This voltage causes current to flow through resistor R124 to the base of the Darlington pair Q130 to energize relay coil 122 (part of snap action relay switch 110) over either diode D127 or D128. The inverter 10 is not operating because an inhibit signal appears on pin 7 of the controlling integrated circuit 20. When AC power disappears from the input of transformer T3, inverter 10 starts and runs in the high power mode since switch contact 112 is in engagement with tap 105. As capacitor C125 discharges through resistor R124, the voltage drop across the Darlington Q130 gradually increases until the relay contact 112 switches from the high power start mode in contact with tap 105, to the normal run mode in contact with feed-in terminal 100. This is so because the turns ratio of transformer T1 is lower thus providing a lower output voltage on winding S1 thereof than previously when transistor $Q_A$ was in circuit with tap 105 through relay witch contact 112. Diode 129 suppresses transients caused by the relay coil 122. Capacitor C131 suppresses transient voltage which may be picked up by the base of the Darlington Q130. Resistor R132 serves as a linear discharge resistor for capacitor C125 to insure a more uniform rate of discharge giving sharper relay drop out. Zener diode D133 prevents low AC line voltage from feeding back and keeping capacitor C125 charged. Any breakdown device with a suitable range may be substituted for the zener diode. It is noted that this circuit is of the quick reset type; that is, if the line voltage temporarily returns, the timing cycle will be repeated.

Figure 2:
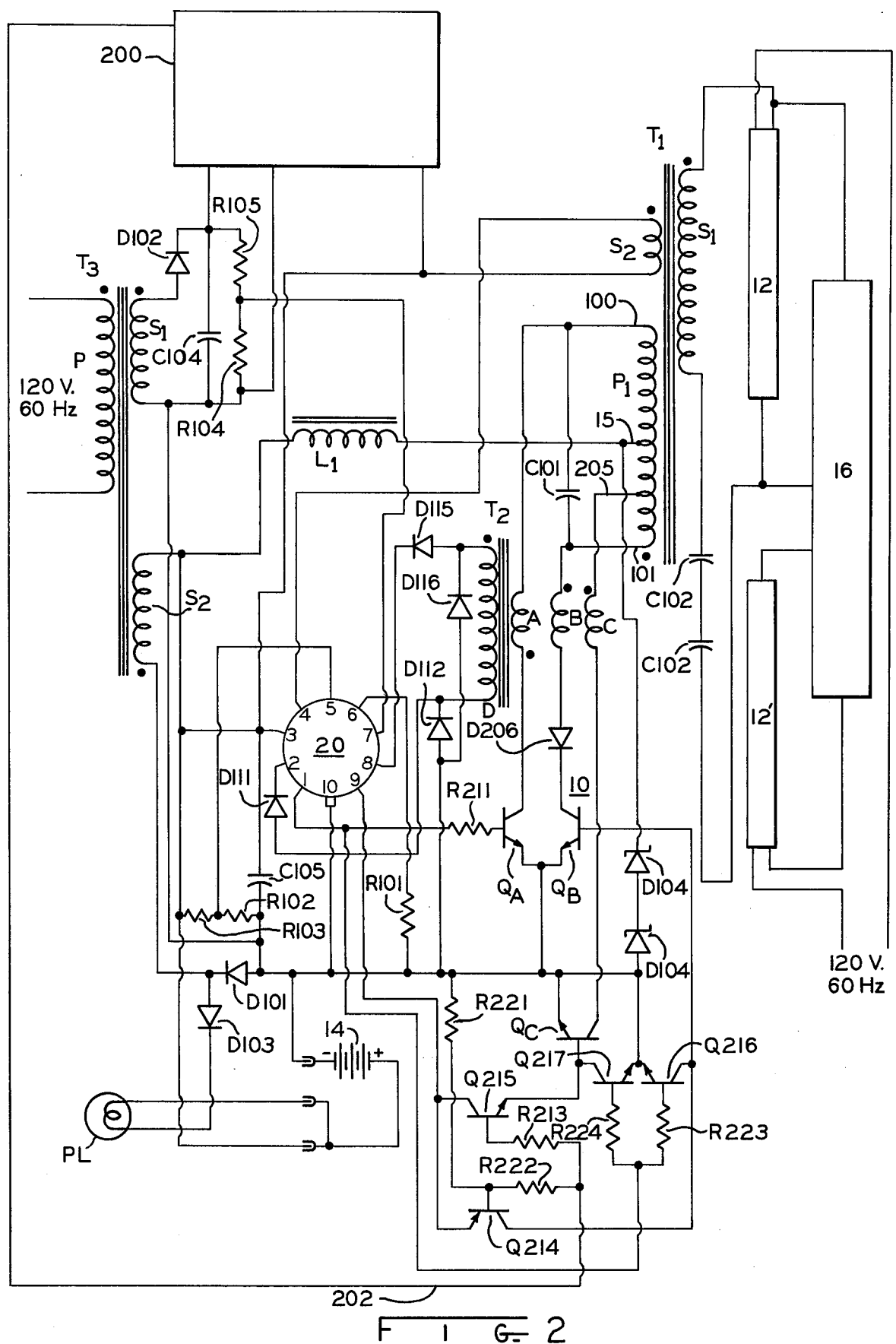
FIG. 2 is a detailed schematic representation of another form of the preferred embodiment.

Referring now to FIG. 2, there is shown another form of the preferred embodiment of the present invention. With the arrangement as shown in FIG. 2, inverter 10 in addition to having transistors $Q_A$ and $Q_B$, includes a third switching transistor $Q_C$ connected through a secondary winding C of feedback transformer T2 to a tap 205 on the primary P1 of transformer T1. While a power transistor may be switched between taps as with a relay, another function is to perform the switching with solid state circuitry by utilizing the two main power transistors $Q_B$ and $Q_C$ and switching the drive from one to the other ($Q_A$ remains always an operating inverter transistor). In the preferred embodiment as shown in FIG. 2, such switching is accomplished on a timed basis using a controller 200 connected in circuit with the emergency lighting system. While timer controller 200 is shown in block diagram form, any device is suitable which is capable of providing, on line 202, a positive signal and after a given period of time, allowing the positive voltage to disappear thence to allow the control lead 202 to be connected to the circuit ground.

When control lead 202 is plus to resistor R213, transistor Q215 is turned on allowing the switching signal from pin 9 of the controller 20 to be connected to the base of transistor $Q_C$. This allows $Q_C$ to turn on and conduct current through secondary winding C of feedback transformer T2. The higher than normal voltage induced on transistor $Q_B$ is blocked by diode D206. When the timer 200 times out and the control lead 202 is grounded, transistor Q215 is turned off and transistor Q214 is turned on allowing the base drive signal coming from pin 9 of controller 20 to be transferred to the base of the main power transistor $Q_B$. Operating all the time are transistors Q216 and Q217 which serve to conduct the stored charges which may exist on transistor $Q_B$ or $Q_C$ to ground and thus hasten the switching of the main power transistor. Transistors Q216 and Q217 duplicate some of the functions existing in the integrated circuit controller 20 and their bases are driven by the current from pin 1 of controller 20. To prevent $Q_A$, Q216 and Q217 from fighting over the drive current available, a resistor R211 is established in the base of transistor $Q_A$ to limit the drive current therein.

Figure 3:
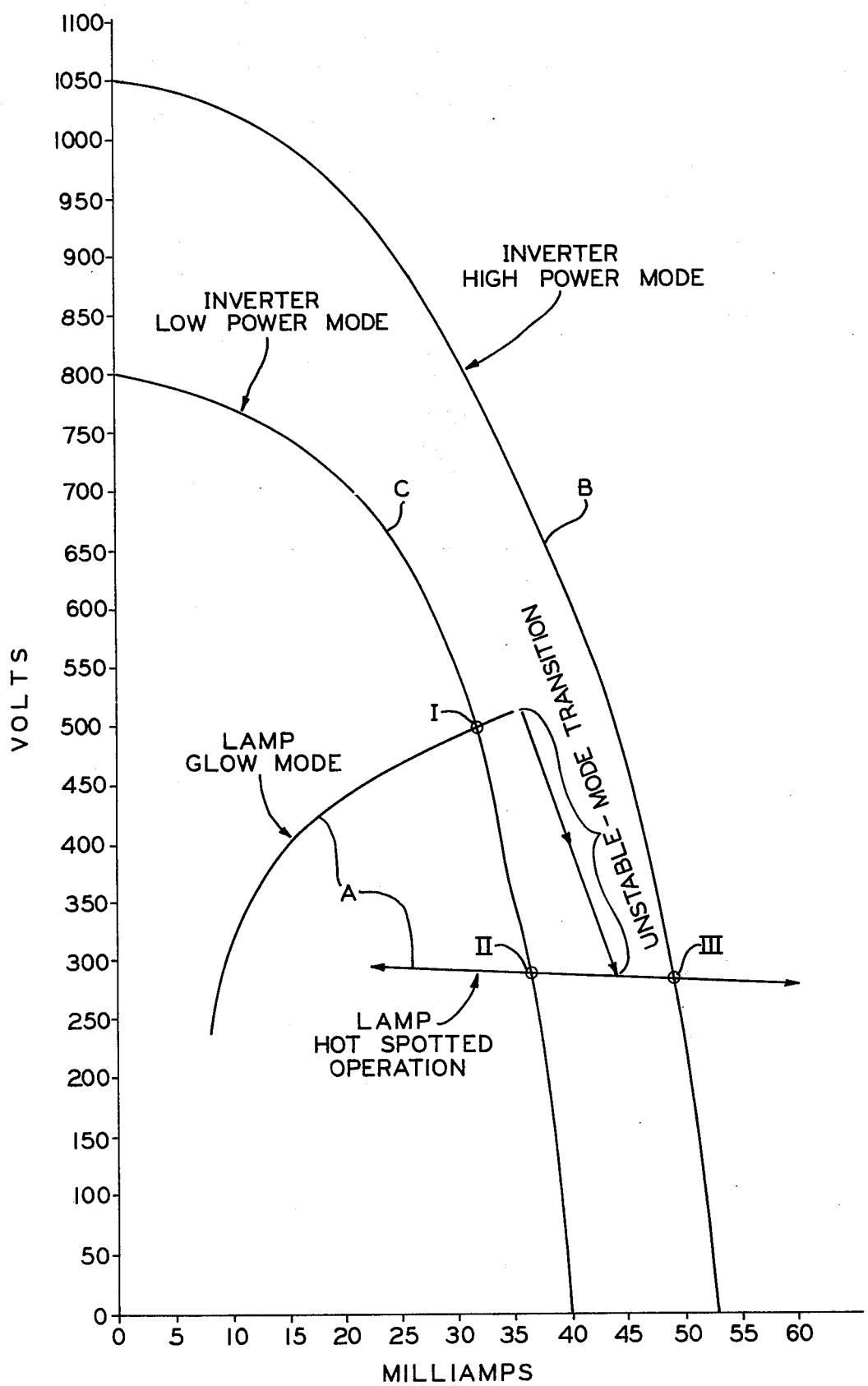
FIG. 3 is a graphical representation showing operating characteristics of the inverter circuit of FIG. 1 and of a typical fluorescent lamp.

FIG. 3 illustrates how such a two level inverter can be applied to operate an eight foot long instant start fluorescent lamp of the type designated as F96T12/IS. Referring to curve A, there is shown that the lamp starts conducting in the vicinity of eight milliamperes when approximately 250 volts are applied across its electrodes. At this time, the electrode phenonema apparently are most important in the lamp since, when current through the lamp is caused to increase, substantially more voltage is required across the electrodes in order to allow the flow of this increased current. By the time the lamp terminal voltage reaches approximately 500 volts, about 35 milliamperes are flowing in the lamp. At this point, enough energy is liberated at the electrodes such that one, and then subsequently two, of the electrodes form electron emitting hot spots which reduce the voltage drop at the electrodes to a relatively low value. All that remains is the voltage drop across the eight feet of conducting plasma in the lamp. This plasma voltage drop is almost invarient with the current going through it as shown by the horizontal line labeled "Lamp Hot Spotted Operation". This curve was taken at approximately 4 to 5 kHz operation and this effect may not be necessarily so at greatly reduced or greatly increased frequency spread. It should be pointed out that in the lamp glow mode where the operation is limited by the voltage drops at the electrodes, such voltage drops consume considerable power yet do nothing to produce light output. Thus, to secure efficient light production from the fluorescent lamp, it is necessary to secure most of the power usage in the lamp in the gas plasma to accomplish the desired electron orbital transitions.

Superimposed on the same graph of FIG. 3 as is the lamp characteristic curve A are the output load lines, both high and low power designated Curve B and Curve C respectively, of the inverter constructed as shown in either of the FIGS. 1 or 2. Thus, if the inverter were operated in the low power mode as shown in Curve C, the inverter would be incapable of driving the lamp from the glow mode into the hot spotted mode because load line C does not intersect the lamp load line A at a point beyond the power input to the lamp which is required for a hot spot transition. The inverter would operate stably at the intercept point marked "I" on curve C. Such an inverter could possibly cause the lamp to occasionally go into the hot spot mode because of extraneous radiation on the lamp. Also the possibility of transients occurring because of switching of power supplies could temporarily force the inverter load line into the unstable mode of the lamp thereby cause the lamp to transition. If the lamp by some method could be transitioned into the hot spot mode, it would operate in equilibrium at point II on the diagram. The advantage of being able to transition to point II can be seen by noting that at point I slightly over 15 watts are being dissipated in the lamp. At point II, only approximately 11 watts are being dissipated yet point II is generating more light output than is point I (light output is related approximately to lamp current). To reliably secure inverter lamp operation at point II, the inverter is first operated in the high power mode according to the load line B. The only place that load line B intercepts the lamp load line A is at point III. This forces the lamp to operate in the hot spotted mode because sufficient energy is supplied to the lamp to generate the required electron emitting spots on the electrodes. After a given period of time, or possibly after some other criterion such as lamp voltage has been satisfied, the inverter then may transition to the low power mode C and hence operate at the intercept point II on the curve.

Once the lamp is operating in the hot spotted mode, as long as this mode of operation is not interrupted, it will continue to do so until the level of lamp operation load line comes close to intercepting the lamp glow mode curve. For emergency lighting purposes, this is advantageous because it means the lamp will stay in this highly efficient light generating condition until the light level produced by the lamp has degenerated considerably.

The emergency lighting circuit including the inverter circuit of FIG. 1 has been built and has operated satisfactorily with components having the following values:

| | |
|---|---|
| transistors Q , Q | GE D42C10 |
| transformer T1 | primary winding D1 - 72 turns, tapped at 36 turns |
| | load winding S1 - 1788 turns |
| | feedback winding S2 - 12 turns |
| transformer T2 | collector windings A & B - 8 turns |
| | output winding D - 160 turns |
| transformer T3 | primary winding P - 1058 turns |
| | secondary winding S1 - 260 turns |
| | secondary winding S2 - 224 turns |
| inductor L1 | 120 turns .0359" |
| lamps 12, 12' | F96T12/IS |

-continued

| | |
|---|---|
| battery 14 | 16.8 VDC |
| resistor R101 | 15 K ohms |
| resistor R102 | 56 K ohms |
| resistor R103 | 56 K ohms |
| resistor R104 | 18 K ohms |
| resistor R105 | 270 K ohms |
| capacitor C101 | 0.68 $\mu$F. |
| capacitor C102, C102' | 5000 pF |
| capacitor C105 | .01 $\mu$F |
| capacitor C104 | .33 $\mu$F |
| diodes D101, D102, D103, | IN 4004 |
| diodes D111, D112, D115 D116 | DA 1701 |
| zener diodes D104 | 21 V ± 5%, ½ W (each) |
| Relay 110 | Form C Reed Relay 24 V dc coil |
| Resistor R124 | 6.8 Megohm |
| Resistor R132 | 10.0 Megohm |
| Capacitor C125 | 2.2 $\mu$fd |
| Capacitor C131 | .01 $\mu$fd |
| Diodes D126, D127, D128 | IN 4004 |
| Diode D129 | DA 1701 |
| Zener Diode D133 | 21 V Zener |
| Darlington Q130 | 2 N 5308 |

The emergency lighting circuit of FIG. 2 has been built and has operated satisfactorily with additional components having the following values:

| | |
|---|---|
| transistor $Q_C$ | GE D42C10 |
| transistor Q214 | 2 N 5811 |
| transistor Q215 | 2 N 5810 |
| transistor Q216 | 2 N 5810 |
| transistor Q217 | 2 N 5810 |
| Resistor R211 | 4.7 ohms |
| Resistor R213 | 2700 ohms |
| Resistor R221 | 180 ohms |
| Resistor R222 | 1 K ohms |
| Resistors R223, R224 | 100 ohms |
| Diode D206 | IN 4004 |
| Transformer T2 | output winding C - 8 turns |

The specific inverter circuit and/or emergency lighting circuits herein described are intended as exemplary and not limitative of the invention. For example, an inverter need not be coupled to a load by a transformer; direct coupling has been contemplated, however, with appropriate circuitry changes. In such applications, other power level switching arrangements will occur to those skilled in the art. Other inverter configurations certainly have been contemplated and include the bridge switching type and others. The appended claims are intended to include such modifications, and others which may occur to those skilled in the art, as coming within the true spirit and scope of the invention.

What is claimed is:

1. In an inverter circuit for operating at least one gaseous discharge lamp from a DC electrical energy source, the improvement comprising:
   switching means in the circuit for automatically operating the circuit on at least two power levels including a first power level for starting the lamp and a second lower power level for operating the lamp after starting thereby to conserve the DC energy source.

2. The invention of claim 1 wherein the inverter circuit further comprises an inverter having an output, means for connecting the inverter with the DC energy source and an output transformer for coupling the inverter with the lamp, said output transformer having a primary winding including a pair of power feed-in terminals and at least on tap for connection to the inverter output.

3. The invention of claim 2 wherein the switching means includes means for automatically switching one side of the inverter output from the tap on the primary winding of the output transformer to one of the power feed-in terminals thereof.

4. In an emergency lighting circuit for operating at least one gaseous discharge lamp including means for connection to an AC electrical energy source for energizing the lamp during normal conditions when the AC source voltage is above a predetermined value and an inverter having an output and an auxiliary electrical energy source for operating the lamp during emergency conditions when the AC source voltage is below a predetermined value, the improvement comprising:
   switching means in the circuit for automatically operating the inverter on at least two power levels for better matching the inverter output capabilities to the lamp starting requirements and after starting, to lamp run requirements thereby to conserve energy in the auxiliary electrical energy source.

5. The invention of claim 4 wherein the circuit includes an output transformer having a primary winding including a pair of power feed-in terminals connected to the inverter output for coupling the inverter with the lamp.

6. The invention of claim 5 wherein the inverter is of the transistor switching type having two transistors capable of operation in a push-pull arrangement, a first of the transistors being connected to a first of the power feed-in terminals of the primary winding.

7. The invention of claim 6 wherein the primary winding of the output transformer includes at least one tap, the switching means including means for connecting a second of the switching transistors upon inverter turn-on to the tap and after a predetermined time, to a second of the power feed-in terminals of the primary winding.

8. The invention of claim 5 wherein the switching means includes means for automatically switching one side of the inverter output from a tap on the primary winding of the output transformer to one of the power feed-in terminals thereon.

9. The invention of claim 8 wherein the means for automatically switching includes a switch operable in response to the operation of a timer.

10. The invention of claim 6 wherein:
   a second of the transistors is connected to a second of the power feed-in terminals of the primary winding; and
   a third transistor is included connected to a tap on the primary winding.

11. The invention of claim 10 further including a controller having timing means for controlling the operation of the third transistor and the first transistor whereby, upon energization of the inverter, the third transistor and first transistors are operated in the switching inverter mode, and after a predetermined time, the third transistor is switched to the off state and the first and second transistors then operate in the switching inverter mode.

* * * * *